Dec. 29, 1959 E. M. CLAYTOR 2,919,000
ONE WAY CLUTCH WITH ELECTROMAGNETIC ENERGIZER
Filed Feb. 6, 1956 2 Sheets-Sheet 1

INVENTOR.
EDWARD M. CLAYTOR
BY: Lowry & Rinehart
ATTORNEYS.

Dec. 29, 1959 — E. M. CLAYTOR — 2,919,000
ONE WAY CLUTCH WITH ELECTROMAGNETIC ENERGIZER
Filed Feb. 6, 1956 — 2 Sheets-Sheet 2

INVENTOR.
EDWARD M. CLAYTOR
BY: Lowry & Rinehart
ATTORNEYS.

United States Patent Office 2,919,000
Patented Dec. 29, 1959

2,919,000

ONE WAY CLUTCH WITH ELECTROMAGNETIC ENERGIZER

Edward M. Claytor, Anderson, Ind., assignor to General Motors Corporation, Detroit, Mich., a corporation of Delaware Application February 6, 1956, Serial No. 563,497

8 Claims. (Cl. 192—84)

This invention relates to a clutch mechanism, and more particularly to an electromagnetic clutch having a pair of relatively movable clutch elements; this clutch being operative to effect a free-running condition between the clutch elements or to lock the clutch elements against relative movement with respect to each other.

An object of this invention is to provide a novel clutch having improved means for locking and unlocking the clutch elements with respect to each other.

A further object of this invention is to provide a novel clutch including electromagnetic means which is energizable to limit relative movement between the clutch elements thereof.

A further object of this invention is to provide a novel magnetic clutch by which the clutch elements thereof can be locked together from unlocked relationship even while they are relatively and/or absolutely stationary.

A still further object of this invention is to provide a novel magnetic clutch by which the clutch elements thereof can be unlocked from locked relationship even while a driving force, tending to cause the clutch input element to run ahead of the clutch output element, is continuously applied to the clutch input element.

Yet another object of this invention is to provide a novel clutch mechanism including unique means for preventing locking together of the clutch elements when one of them is rotating at such a high speed that such locking might result in severe shock between the clutch elements.

Further objects will become apparent as the description proceeds.

To the accomplishment of the above and related objects, this invention may be embodied in the forms illustrated in the accompanying drawings, attention being called to the fact, however, that the drawings are illustrative only, and that changes may be made in the specific constructions illustrated and described, so long as the scope of the appended claims is not violated.

Figure 4:
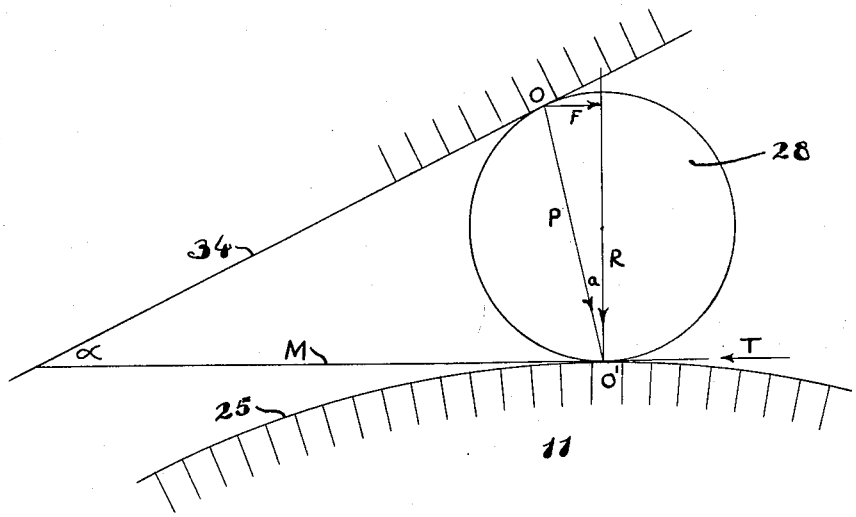
Figure 5:
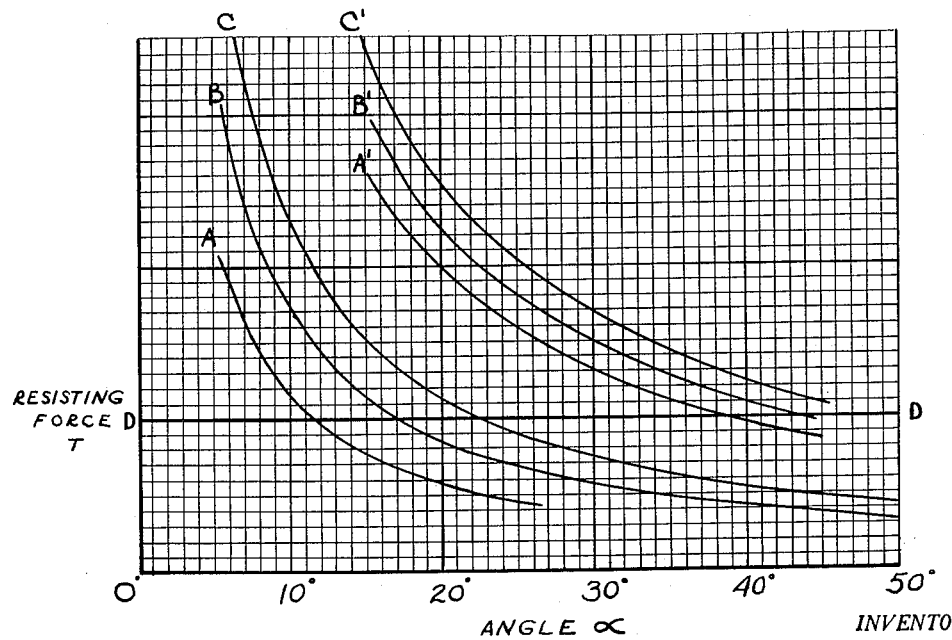

Fig. 4 is a diagram illustrating the forces applied to and through a locking roller and the cooperating surfaces of the respective clutch elements of a device constructed in accordance with the present invention; and Fig. 5 is a graph showing the manner in which the frictional locking force of the improved clutch varies with the angle of inclination of a portion of a recess in one of the clutch elements for different coefficients of friction.

Figures 1, 2, 3:
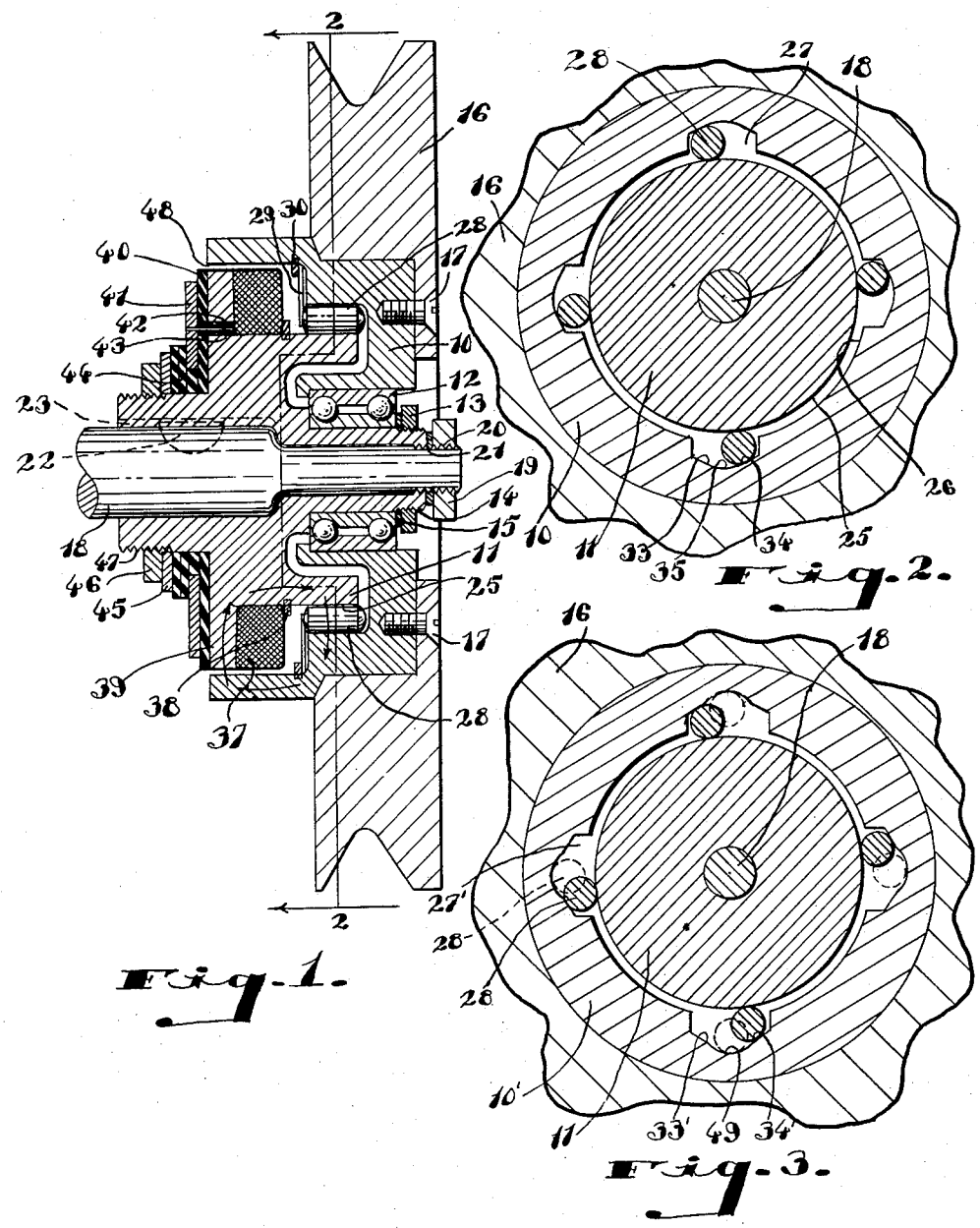
Fig. 1 is a view partly in section of a clutch mechanism embodying the invention.
Fig. 2 is a sectional view taken along line 2—2 of Fig. 1.
Fig. 3 is a sectional view similar to Fig. 2 but illustrating one of the clutch elements as having a plurality of recesses of different form that those shown in Fig. 2.

Referring to Fig. 1, the improved clutch mechanism includes a pair of clutch elements 10 and 11, respectively, mounted for relative movement in opposite directions with respect to each other about their common axis. Each of clutch elements 10 and 11 is preferably formed of a ferrous magnetizable material. Suitable anti-friction bearing means 12 may be provided between clutch elements 10 and 11, and a nut 13 in threaded engagement with portion 14 of clutch element 11 may be tightened against washer 15, which bears against the inner race of bearing 12, to secure the bearing means in place. Bearing means 12 is preferably formed of a suitable non-magnetic material such as stainless steel so that it is not affected magnetically. Clutch element 10 can be the driving or the driven member of the clutch, and may have a pulley wheel 16 fixedly secured thereto by means of a plurality of headed screws 17, 17 in the manner shown in Fig. 1.

Clutch element 11 may likewise be the driving or the driven member. A nut 19 disposed in tightened, threaded relation with end portion 20 of shaft 18 bears against a washer 21 which in turn bears against an end face of clutch element 10. A Woodruff key 22 lying in a complementary slot in shaft 18 has a portion lying in keyway 23 provided by inner clutch element 11. In this manner shaft 18 is relatively fixed with respect to clutch element 11.

Referring to Fig. 2 along with Fig. 1, it is apparent that a peripheral portion of inner clutch element 11 provides a surface 25 which lies adjacent to surface 26 provided by an inner peripheral portion of outer clutch element 10. Provided along the surface 26 of clutch element 10 is a plurality of recesses 27. The particular number of recesses provided in clutch element 10 is not critical, and in some installations only a single recess need be provided. Usually, however, a plurality of recesses is provided in equally spaced relationship about surface 26. Disposed in each of recesses 27 is a friction member or locking member in the form of a roller 28 which may be of generally cylindrical shape and has its axis lying transversely with respect to the opposite directions of relative movement between the clutch elements. Each of rollers 28 is formed of a suitable ferrous, magnetizable material. Each of rollers 28 is confined against axial movement within its respective recess 27 by means of a keeper member 29 held in fixed relationship with respect to clutch element 10 by means of an annular thrust member such as a split ring 30 fixedly seated in a complementary slot provided by clutch element 10.

Each of recesses 27 includes two inclined portions 33 and 34 which merge with each other along a smooth curve 35. Portion 33 is inclined away from the proximal portion of surface 25 in one direction in which clutch element 10 is movable relative to clutch element 11. That is, portion 33 is inclined outwardly away from the proximal portion of surface 25 of clutch element 11 in a counter-clockwise direction as viewed in Fig. 2. Since clutch element 10 is movable in the opposite direction with respect to clutch element 11, another inclined portion 34 is provided by each of recesses 27; each of portions 34 being inclined away from the proximal portion of surface 25 of clutch element 11 in the opposite direction, namely, in the clockwise direction as viewed in Fig. 2.

Referring to Fig. 1, it will be seen that an electromagnet in the form of an annular coil 37, consisting of a plurality of turns of electrically conductive material, is fixedly carried by inner clutch element 11. One of the terminals of coil 37 is preferably grounded, and coil 37 is fixed against axial movement in one direction by means of an annular thrust member such as a split ring 38 which is embedded in a recess provided in the outer periphery of inner clutch element 11. Coil 37 is seated against the inner radial surface provided by flange 39 of clutch element 11. An annular insulating member 40 is interposed between an electrically-conductive, annular contact plate 41 and flange 39. A terminal 42 extending from contact plate 41 passes through an opening in flange 39 and electrically connects coil 37 with contact plate 41. As is apparent from Fig. 1, terminal 42 is surrounded by suitable insulating means 43 to insulate it from clutch element 11, and an air gap at 48 is provided between electromagnet 37 and the adjacent inner peripheral surface of clutch element 10. Contact plate 41 is preferably connected through an on-off switch to a source of electrical energy by means of one or more fixed brushes disposed in sliding engagement with the contact plate. Since the brushes, switch, source of electrical energy and their interconnecting means merely represent a conventional arrangement to electrically connect a rotatable member, the drawing has not been unnecessarily complicated by including these parts therein.

A plurality of annular insulating members 44 insulate the remainder of contact plate 41 from clutch element 11. Contact plate 41 and insulating members 40 and 44 are secured in the relationship shown in Fig. 1 by means of a nut 46 tightened on threaded portion 47 of clutch element 11 into engagement with washer 45 which bears against the axially outer layer of insulation 44.

It is apparent that electromagnet 37 is disposed, when energized, to produce a magnetic field having lines of force extending in the general direction indicated by the arrows in Fig. 1, transversely across each of inclined portions 33 and 34, transversely through the respective rollers 28 and transversely across the portions of surface 25 of clutch element 11 which are proximal with respect to each of portions 33 and 34.

Assuming that clutch element 10 is the driving member and that it is rotated at a moderate speed in a clockwise direction as viewed in Fig. 2, it will be apparent that, while electromagnet 37 is not energized, each of rollers 28 will be engaged by inclined portion 34 of its respective recess. The angle of inclination of each of portions 34 with respect to the respective proximal portion of surface 25 of clutch element 11 will be determined by a number of considerations soon to become apparent. In any event, however, the invention contemplates that this angle of inclination be sufficiently large that substantially no wedging or locking effect will result when each of rollers 28 is so engaged by its respective inclined portion 34. Instead, each of the rollers 28 is normally rotatable within its respective recess during relative clockwise movement of clutch element 11 with respect to clutch element 10, and friction between roller 28 and each of surfaces 25 and 26 is minimized.

It will be clear, and it must be remembered throughout the remainder of this description, that each inclined portion 33 of each of recesses 27 provides the same function and effect, during counter-clockwise rotation of clutch element 10 with respect to clutch element 11, as that provided by inclined portion 34 of that recess during clockwise rotation of clutch element 10 with respect to clutch element 11.

With electromagnet 37 deenergized and clutch element 10 rotating in a clockwise direction relative to clutch element 11, the clutch elements are movable freely with respect to each other and no locking effect is provided by rollers 28. Upon energization of electromagnet 37 and with portion 34 disposed at the proper angle of inclination, a complex combination of forces comes into play which, in a manner to be described following, is effective to lock the clutch elements against relative movement. When electromagnet 37 is energized, it produces a magnetic field having lines of force extending transversely with respect to each of inclined portions 33 and 34, transversely through respective roller 28 and transversely with respect to the respective proximal portions of surface 25. This magnetic field attracts or forces each of rollers 28 radially inwardly toward surface 25 of clutch element 11. With the rollers being forced against surface 25 by the electromagnet, each of portions 34 comes into forcible engagement with its respective roller to provide a reaction force directed through that roller against surface 25 of clutch element 11. This reaction force has a radially inwardly extending component which supplements the radially inwardly extending force exerted on each of rollers 28 by the electromagnet 37. This reaction force also has a resulting component extending opposite to the inertia force exerted by clutch element 11 against each of rollers 28. Furthermore, each of portions 34 being inclined with respect to the proximal portion of surface 25, a secondary effect of the lines of force extending across these angularly related surfaces is produced which tends to pull the respective roller 28 toward the crotch between these surfaces. This secondary effect provides an additional component of force tending to prevent relative movement between the clutch elements. The cumulative effect of energization of the electromagnet during relative movement of the clutch elements as described above is to prevent rotation of each of the rollers about its axis and to set up a composite force exerted by each of rollers 28 against surface 25 which overcomes the inertia of clutch element 11; thereby locking the clutch elements against relative movement with respect to each other.

As stated above, portion 33 of each of recesses 27 will provide the same function and effect during rotation of outer clutch element 10 in the counter-clockwise direction with respect to inner clutch element 11 that portion 34 provides during clockwise rotation of clutch element 10 with respect to clutch element 11. In this manner, the present improved locking means is equally effective to lock the clutch elements together in both of the relatively opposite directions of relative movement between the clutch elements.

A brief mathematical analysis of the forces involved may make the operation of the improved clutch mechanism more clear. In Fig. 4, M is tangent to the surface of roller 28 and to surface 25 of clutch element 11. The angle $\alpha$ then represents the angle of inclination of inclined portion 34 with respect to the proximal portion of surface 25 of clutch element 11. The angle $a$ represents the stubbing angle between inclined portion 34 and surface 25. It will be clear that stubbing angle $a$ is equal to one-half of the angle of inclination of portion 34. That is $$a = \frac{\alpha}{2}$$

If it were assumed that surface 34 applies a reaction force P along line O, O', and that roller 28 does not rotate about its axis (which will be the prevailing conditions when the locking function is effected), reaction force P can be separated into a first component F which is opposite in direction to the available frictional resisting force T between surface 25 and the surface of roller 28, and a second component R which presses the roller 28 radially against surface 25 or in a direction perpendicular to the proximal portion of surface 25.

Letting $f$ stand for the coefficient of friction, which is the ratio of the frictional force available to resist sliding movement between two bodies to the force with which the bodies are pressed together in a direction perpendicular to the direction of relative sliding movement therebetween, $$f = \frac{T}{R} \text{ and } T = Rf$$

Referring to Fig. 4, it will be observed that $$P = \frac{F}{\sin\frac{\alpha}{2}} \text{ and } R = P\cos\frac{\alpha}{2}$$

Therefore, $$R = \frac{F}{\sin\frac{\alpha}{2}} \times \cos\frac{\alpha}{2} = F\cot\frac{\alpha}{2}$$

From above $$T = fR$$

and therefore, $$T = Ff\cot\frac{\alpha}{2}$$

It will be further observed from Fig. 4 that when T is less than F, roller 28 will skid on surface 25 and clutch elements 10 and 11 will not lock together. From the last written equation, it is apparent that when T is less than F, the product of $$f\cot\frac{\alpha}{2}$$

must be less than 1. Although, as a practical matter, the value of $f$ may vary during operation of the clutch due, for example, to the presence of dust between the surface of the roller and surface 25, for the purposes of this analysis it may be assumed that $f$ will be approximately 0.15. As pointed out subsequently in this description, the ideal range for angle $\alpha$ is between 24° and 28°. Taking the value of 26° for $\alpha$, and substituting this value for $\alpha$ and the value 0.15 for $f$ in the formula $$f\cot\frac{\alpha}{2}$$

the result should be less than 1 for the non-locking condition (that is, when electromagnet 37 is not energized).

$$f\cot\frac{\alpha}{2} = 0.15 \times \cot\frac{26}{2} = 0.15 \times 4.3 = 0.645$$

Since 0.645 is less than 1, it will be apparent that with an angle $\alpha$ of 26°, the frictional resisting force T will be less than tangential force F and the clutch elements will not lock.

It will also be observed from Fig. 4 that when T is greater than F, roller 28 will not skid on surface 25 and the clutch elements 10 and 11 will lock together. It will be apparent that when electromagnet 37 is energized, $f$ will be equal to $f_n + f_m$ where $f_n$ is the component of the coefficient of friction developed without magnetic attraction (and as noted above $f_n = 0.15$) and $f_m$ is the component of the coefficient of friction developed by magnetic attraction alone.

There is provided a magnetic flux with electromagnet 37 of sufficiently high density to effect an $f_m$ of approximately 2.5.
The $$(f_n + f_m)\cot\frac{\alpha}{2} = (0.15 + 2.5)4.3 = 11.4$$

since 11.4 is a great deal more than 1, the frictional resisting force T will be greater than the tangential force F and the clutch elements will lock together.

Of course, this mathematical analysis ignores the secondary magnetic effect described above whereby each of rollers 28 is attracted or forced toward the crotch of angle $\alpha$. However, the forces resulting from this effect obviously do not effect the value of $f_n$ and do increase the value of $f_m$ to obvious advantage.

The variation of the available frictional resisting force T with various angles $\alpha$ for different coefficients of friction $f$ is depicted by the graph shown in Fig. 5. Curves A, B and C represent this variation for $f$ values of 0.10, 0.15 and 0.20, respectively, when electromagnet 37 is not energized. Curves A', B' and C' represent this variation for $f$ values of 2.60, 2.65 and 2.70, respectively, when electromagnet 37 is energized. By way of example, it is pointed out that the value of $f$ for curve B' is equal to the value of $f$ for curve B plus 2.5 which is the added component of the coefficient of friction provided by the electromagnet. This relationship holds true, of course, for each of the other pairs of curves. In this graph, line D, D represents the level at which T is equal to F. At any point above this line the clutch elements will be locked together, and at any point therebelow, they will be unlocked.

It is apparent then that the total force tending to prevent relative movement between the clutch elements which results from activation or energization of the electromagnet 37, is made up of a primary and a secondary magnetic component along with a reaction component. As is indicated to some extent by the graph shown in Fig. 5, the angle of inclination of each of portions 33 and 34 with respect to the proximal portion of surface 25 may vary within a substantial range but ideally is between 24 and 28 degrees. This range may extend up to 40 degrees with light loading. It has been found that when this angle of inclination is between 20 and 24 degrees, the behavior of the clutch is sometimes erratic.

In Fig. 3, a modified form of clutch mechanism is illustrated. In the form shown in Fig. 3, all of the parts are of the same construction and provide the same function and effect as corresponding parts in the modification shown in Fig. 2, except for the conformation of each of recesses 27'. Each of recesses 27' provides a pair of oppositely disposed portions 33' and 34' which are disposed on opposite sides of a pocket 49. Each of portions 33' and 34' of recesses 27' operate in the manner described with respect to surfaces 33 and 34 of each of recesses 27 shown in Fig. 2. During high-speed rotation of clutch element 10', each of rollers 28, under the action of centrifugal force, will move into the pocket provided by that respective recess when the electromagnet is not energized. Each of the pockets 49 extends radially outwardly a sufficient distance that during such high speed rotation, the magnetic force exerted on each of rollers 28 is insufficient to overcome the centrifugal force exerted thereon. With the provision of the pockets 49, it is necessary to reduce the speed of clutch element 10' to a value such as to permit the rollers 28 to leave the pockets 49, before energization of the magnet can accomplish the locking or clutching function, thereby guarding against the shock which might result, in the absence of such a pocket, if the electromagnet were energized at a time when the ratio between the speeds of the driving and driven element was high.

It will be apparent that a novel clutch mechanism has been provided which is effective to be selectively activated to either permit a free-running condition between the clutch elements, or to lock the clutch elements together; and which utilizes a combination of reaction and magnetic forces to provide the locking function. Also, since the locking and unlocking functions provided by the improved clutch mechanism are effected independently of relative motion between the clutch elements and absolute motion of the clutch elements, it is apparent that the locking function can be effected even while the clutch elements are relatively and/or absolutely stationary and that the unlocking function can be effected even while a driving force, tending to cause the clutch input element to run ahead of the clutch output element, is continuously applied to the clutch input element. Although the invention has been described in the environment of a clutch having relatively rotatable members, it will be apparent that the improved locking means is equally effective in an environment in which the clutch elements are movable linearly with respect to each other.

What is claimed as new is:

1. A clutch mechanism comprising a pair of relatively adjacent magnetizable clutch elements, one or more magnetizable locking members disposed between said clutch elements each member being loosely guided in a longitudinally wedged pocket in one of said elements and normally providing negligible friction between said clutch elements, and electromagnetic means disposed in one of said elements to produce at all rotative positions of said clutch elements, when energized, a magnetic field having lines of force extending through and transversely of the axis of said locking members which are disposed parallel to the walls of the pockets for attracting said locking members into immobile wedged locking engagement with said elements whereby the clutch elements are prevented from moving relative to each other.

2. A clutch mechanism including a pair of magnetizable clutch elements having concentric radially spaced inner and outer parts the outer part providing one or more recesses with circumferentially inclined bottoms, a cylindrical magnetizable friction member disposed between said parts in each of said recesses, and electromagnetic means mounted in said parts and disposed, when energized, to attract at all rotative positions of said clutch elements each of said friction members into frictional locking enegagement with respect to said parts to lock said clutch elements against relative rotation with respect to each other, said electromagnetic means, when energized, also producing an electromagnetic field having lines of force extending through and transversely of the longer axis of each magnetizable friction member, whereby during the energization of said electromagnetic means, each magnetizable friction member will be disposed in an immobile wedged locking position intermediate said clutch elements.

3. A clutch mechanism including a pair of clutch elements, a part of one of said clutch elements being rotatable within and with respect to a part of the other of said clutch elements, the outer part providing one or more recesses having circumferential wedges, a magnetizable friction member between said parts and disposed in each of said recesses, electromagnetic means disposed, when energized, to produce an electromagnetic field having lines of force extending through and transversely of the axis of each friction member which axis parallels the wall of the recess in which the friction member is disposed so as to attract each of said friction members into frictional locking relation with respect to said parts to lock said clutch elements and said friction members against relative rotation with respect to each other in all rotative positions of said clutch elements, each of said recesses including a radially outwardly extending pocket for receiving its respective friction member when said outer part is rotated at relatively high speeds and each of said pockets extending radially outwardly a sufficient distance that during excessively high speeds of rotation, the force exerted on each of said friction members by said electromagnetic means is insufficient to overcome the centrifugal force exerted on each of the friction members.

4. A clutch mechanism comprising a pair of normally relatively movable clutch elements, each of said clutch elements having a surface lying closely spaced from a surface of the other clutch element, one of said surfaces providing one or more recesses, each of said recesses including a wedge portion inclined away from the respective proximal portion of the other of said surfaces in a direction in which the clutch element having said one surface is movable relative to the other clutch element, a magnetizable locking member disposed in each of said recesses, the angle of inclination of said portion of each of said recesses with respect to said respective proximal portion being sufficiently large that substantially no frictional force between said other surface and each of said locking members exists during said relative movement, and electromagnetic means, when activated, for forcing each of said locking members into locking relationship with said other surface in all rotative positions of said clutch elements to thereby prevent relative movement between said clutch elements.

5. A clutch mechanism comprising a pair of clutch elements having relatively adjacent surfaces, the surface of one of said clutch elements providing one or more recesses, each of which includes an inclined wedge portion, a magnetizable locking member disposed in each of said recesses, the inclined portion of each of said recesses lying at a sufficiently large angle with respect to the respective proximal portion of the surface of the other of said clutch elements that said clutch elements are substantially freely movable with respect to each other, and electromagnetic means disposed to produce at all rotative positions of said clutch elements, when energized, a magnetic field having lines of force extending through and transversely of the axis of each locking member which axis parallels the wall of the recess within which the member is disposed for attracting each of said locking members toward said respective proximal portion to bring each of said locking members into locking contact with said surface of the other of said clutch elements and thereby prevent relative movement between said clutch elements.

6. A clutch mechanism comprising a pair of normally relatively movable clutch elements, each of said clutch elements having a surface lying adjacent a surface of the other clutch element, one of said surfaces providing one or more recesses, each of said recesses including a wedge portion inclined away from the respective proximal portion of the other of said surfaces in a direction in which the clutch element having said one surface is movable relative to the other clutch element, a cylindrical magnetizable roller disposed in each of said recesses with its axis lying transversely with respect to said direction of relative movement, the angle of inclination of said portion of each of said recesses with respect to said respective proximal portion being sufficiently large that each of said rollers, when in engagement with said other surface, is normally rotatable about its axis whereby the frictional force between each of the rollers and said other surface is minimized, and electromagnetic means for producing, when energized, an electromagnetic field having lines of force extending through and transversely of the axis of the rollers which parallel the walls of the recesses with which they are associated for wedging each of said rollers against said other surface at all rotative positions of said clutch elements whereby rotation of each of said rollers about its axis is prevented and said clutch elements are locked against relative movement.

7. A clutch mechanism comprising a pair of normally relatively movable clutch elements, each of said clutch elements having a surface lying adjacent a surface of the other clutch element, one of said surfaces providing one or more recesses, each of said recesses including a wedge portion inclined away from the respective proximal portion of the other of said surfaces in a direction in which the clutch element having said one surface is movable relative to the other clutch element, a magnetizable cylindrical roller disposed in each of said recesses with its axis lying transversely with respect to said direction of relative movement, the angle of inclination of said portion of each of said recesses with respect to said respective proximal portion being sufficiently large that each of said rollers, when in engagement with said other surface, is normally rotatable about its axis whereby the frictional force between each of the rollers and said other surface is minimized, and means operative at all rotative positions of said clutch elements, when activated, for producing a magnetic field having lines of force extending across each of said inclined portions, transversely through the respective roller and across the respective proximal portion of the other of said surfaces to attract each of said rollers in a direction generally opposite to said first-mentioned direction and toward said respective proximal portion to lock said clutch elements and said rollers against relative movement.

8. A clutch mechanism comprising a pair of clutch elements, each of said clutch elements being movable in opposite directions with respect to the other clutch element and having a surface lying adjacent a surface of the other clutch element, one of said surfaces providing one or more recesses, each of said recesses including two wedge portions, one of said portions being inclined away from the respective proximal portion of the other of said surfaces in one of said opposite directions and the other portion being inclined away from the respective proximal portion of the other of said surfaces in the other direction, a magnetizable cylindrical roller disposed in each of said recesses with its axis lying transversely with respect to said directions of relative movement, the angle of inclination of each of said portions with respect to said proximal portion being sufficiently large that each of said rollers, during relative movement in either of said directions between said clutch elements, is normally rotated about its axis whereby the frictional force between each of said rollers and said other surface is minimized, and means for selectively producing at all rotative positions of said clutch elements a magnetic field having lines of force extending across each of said inclined portions, transversely through the respective roller and across the respective proximal portion of the other of said surfaces to attract, during relative movement of said clutch members, each of said rollers in a direction generally opposite to the direction of relative movement of the clutch element having said one surface with respect to the other clutch element and toward said respective proximal portion to lock said clutch elements and said rollers against relative movement.

References Cited in the file of this patent

UNITED STATES PATENTS

| | | |
|---|---|---|
| 517,831 | Arnold | Apr. 10, 1894 |
| 1,144,067 | Rundlof | June 22, 1915 |
| 1,334,759 | Huebner | Mar. 23, 1920 |
| 1,976,791 | Ljungstrom | Oct. 16, 1934 |
| 2,051,783 | Dake | Aug. 18, 1936 |
| 2,076,635 | Halstead | Apr. 13, 1937 |
| 2,300,223 | Hottenroth | Oct. 27, 1942 |
| 2,583,843 | Herrick | Jan. 29, 1952 |
| 2,596,654 | Clark et al. | May 13, 1952 |
| 2,612,248 | Feiertag | Sept. 30, 1952 |
| 2,718,292 | Meilander et al. | Sept. 20, 1955 |
| 2,804,184 | Bjork | Aug. 27, 1957 |

FOREIGN PATENTS

| | | |
|---|---|---|
| 459,860 | France | Sept. 18, 1913 |